US006986026B2

United States Patent
Roth et al.

(10) Patent No.: US 6,986,026 B2
(45) Date of Patent: Jan. 10, 2006

(54) SINGLE-STEP PROCESSING AND SELECTING DEBUGGING MODES

(75) Inventors: Charles P. Roth, Austin, TX (US); Ravi P. Singh, Austin, TX (US); Tien Dingh, Cedar Park, TX (US); Ravi Kolagotla, Austin, TX (US); Marc Hoffman, Mansfield, MA (US); Russell Rivin, Holliston, MA (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 553 days.

(21) Appl. No.: 09/738,649

(22) Filed: Dec. 15, 2000

(65) Prior Publication Data
US 2004/0073780 A1 Apr. 15, 2004

(51) Int. Cl.
G06F 9/00 (2006.01)

(52) U.S. Cl. ...................................................... 712/227
(58) Field of Classification Search ................ 712/227
See application file for complete search history.

(56) References Cited

U.S. PATENT DOCUMENTS

| 4,308,581 | A |   | 12/1981 | Raghunathan |
| 5,530,804 | A |   | 6/1996 | Edgington et al. |
| 5,682,310 | A |   | 10/1997 | Pedneau et al. |
| 5,740,413 | A |   | 4/1998 | Alpert et al. |
| 5,790,843 | A | * | 8/1998 | Borkenhagen et al. ...... 712/226 |
| 6,035,422 | A | * | 3/2000 | Hohl et al. .................... 714/35 |

OTHER PUBLICATIONS

"Efficient Mechanism for Multiple Debug Modes", IBM Technical Disclosure Bulletin, Nov. 1995, vol. 38 Issue 11 ☐☐ pp. 65–68.*

* cited by examiner

Primary Examiner—Eddie Chan
Assistant Examiner—Charles Harkness
(74) Attorney, Agent, or Firm—Fish & Richardson P.C.

(57) ABSTRACT

In one embodiment, techniques are disclosed for causing a programmable processor to process one instruction at a time. Single-step debugging may be performed by taking an exception after each instruction or by invoking emulation mode after each instruction. The particular single-step debugging technique may be based upon state of control bits, or may be based upon the processor's current mode of operation, or both.

29 Claims, 5 Drawing Sheets

SINGLE-STEP PROCESSING AND SELECTING DEBUGGING MODES

BACKGROUND

This invention relates to programmable processors.

A programmable processor, such as a microprocessor for a computer or a digital signal processing system, may execute instructions far more rapidly than a human being can execute them. Consequently, when a processor makes an error, which may occur for several reasons, the error usually occurs so quickly that a human cannot directly observe what led to the error. Various techniques, generally called "debugging," may be employed to track down the source or sources of the error.

DETAILED DESCRIPTION

Figure 1:
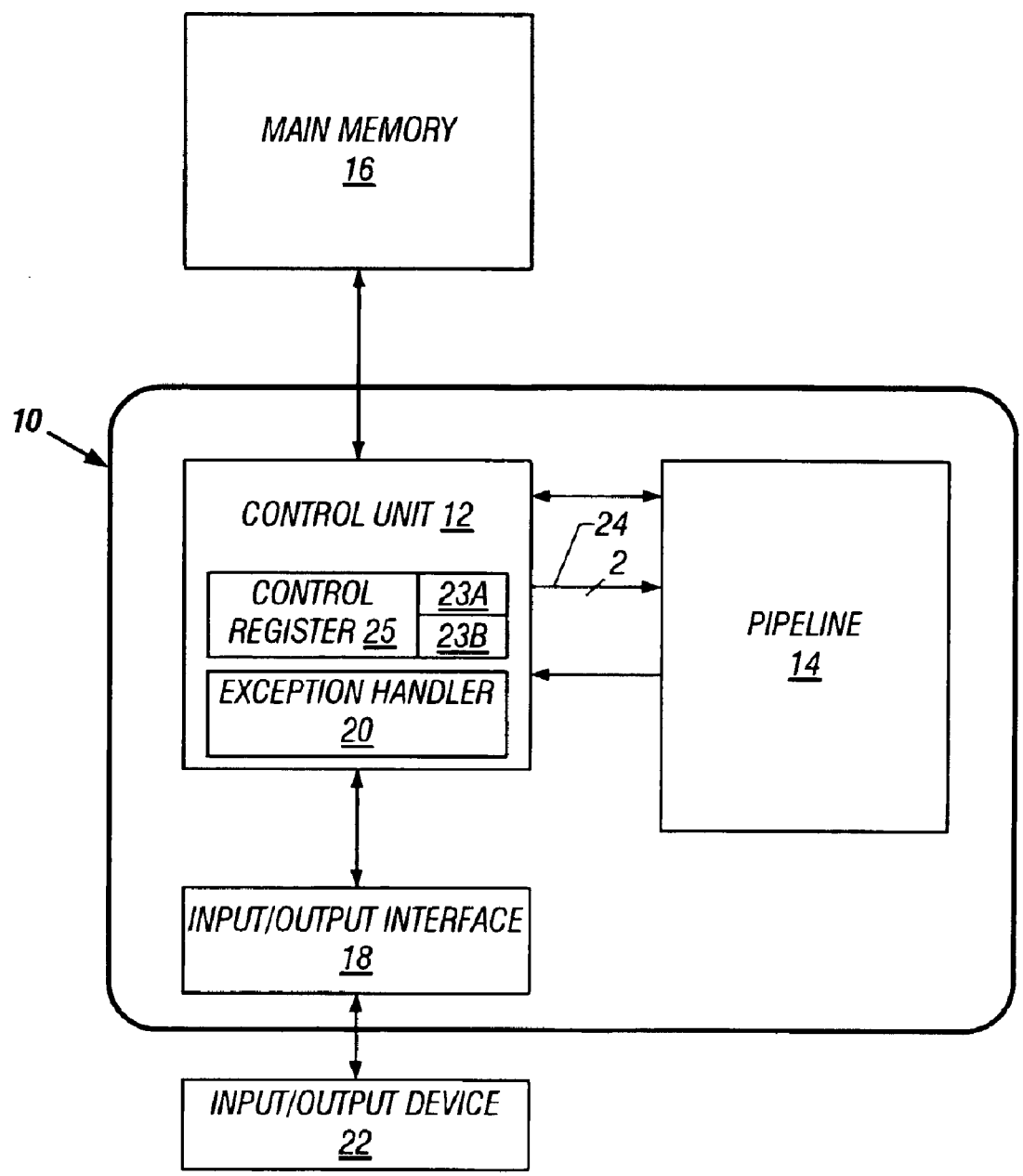
FIG. 1 is a block diagram illustrating an example of a pipelined programmable processor.

FIG. 1 is a block diagram illustrating programmable processor 10 coupled to main memory 16 and input/output device 22. Processor 10 includes control unit 12, execution pipeline 14 and input/output interface 18 and may be, for example, a digital signal processor.

Control unit 12 may control the flow of instructions and data through pipeline 14. For example, during the processing of an instruction, control unit 12 may direct the various components of pipeline 14 to decode the instruction and perform the corresponding operation including, for example, writing the results back to main memory 16.

Control unit 12 may include exception handler 20, which may hold addresses of pre-defined instructions to be processed in pipeline 14 when an exception is raised. Control unit 12 may also include control register 25, which stores data related to control functions. Control bits 23A and 23B in control register 25 comprise information related to single-step debugging techniques, as will be described in more detail below. The state of control bits 23A and 23B can be sensed by pipeline 14 via two-bit bus 24.

Main memory 16 may store information such as instructions and data. Main memory 16 may comprise static random access memory (SPAM), dynamic random access memory (DRAM), flash memory or the like. Processor 10 may include components not shown in FIG. 1, such as an instruction cache. A user may communicate with processor 10 via one or more input-output devices 22, such as a keyboard, mouse, stylus or other pointing device, coupled to processor 10 by way of interface 18. Processor 10 may communicate with a user via one or more input-output devices 22, such as a display screen or printer, coupled to processor 10 by way of interface 18.

Figure 2:
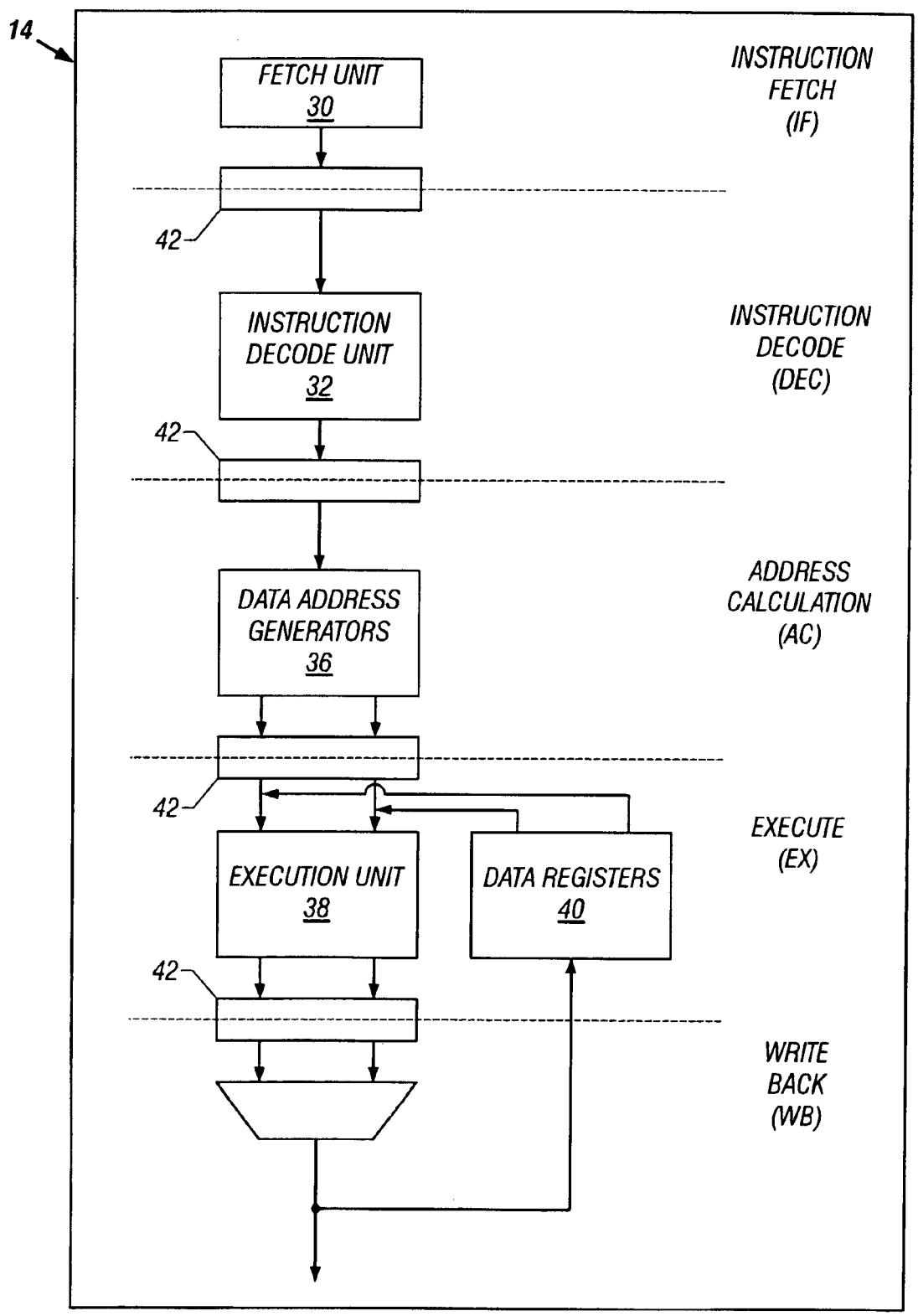
FIG. 2 is a schematic illustrating an example execution pipeline.

FIG. 2 illustrates an example pipeline 14. Pipeline 14, for example, may have five stages: instruction fetch (IF), instruction decode (DEC), address calculation (AC), execute (EX) and write back (WB). Instructions may be fetched from memory 16 or from an instruction cache during the first stage (IF) by fetch unit 30 and may be decoded by instruction decode unit 32 during the second stage (DEC). At the next clock cycle, the results may be passed to the third stage (AC), where data address generators 36 calculate any memory addresses to perform the operation. During the execution stage (EX), execution unit 38 may perform the specified operation such as, for example, adding or multiplying two numbers. During the final stage (WB), the results may be written back to main memory 16 or to data registers 40.

Pipeline 14 typically includes stage registers 42 that are used as temporary memory storage elements and may be used to pass results and other information from stage to stage. In addition to registers 42 and data registers 40, pipeline 14 may include additional memory elements or registers for holding instructions, addresses, data or other information.

Pipeline 14 ordinarily processes instructions in a substantially concurrent manner, with several instructions in pipeline 14 in different stages. For example, while one instruction is in the WB stage, another instruction may be in the EX stage, and a further instruction may be in the AC stage. In some circumstances, however, it may be advantageous to process one instruction, then examine the states of processor 10 and/or the contents of the various registers before completing the processing of the following instruction. Processing instructions in this fashion is called "single-step debugging" and may be desirable, for example, during debugging. Debugging may involve, for example, executing an instruction and examining the contents of memory elements such as registers before executing the next instruction. Single-step debugging and examination of memory elements may allow a user to understand whether an error is hardware-based or software-based, to identify problems in the hardware or software, and to observe the interaction among software instructions. Debugging may take place during development of processor 10, before processor 10 is incorporated into a product. Debugging and may also be performed after processor 10 is incorporated into a product.

When a user wants to begin single-step debugging, the user may give a command to processor 10 by way of an input-output device 22, such as a keypad. Processor 10 may support different modes of single-step debugging, and the user may further specify the desired manner.

Figure 3:
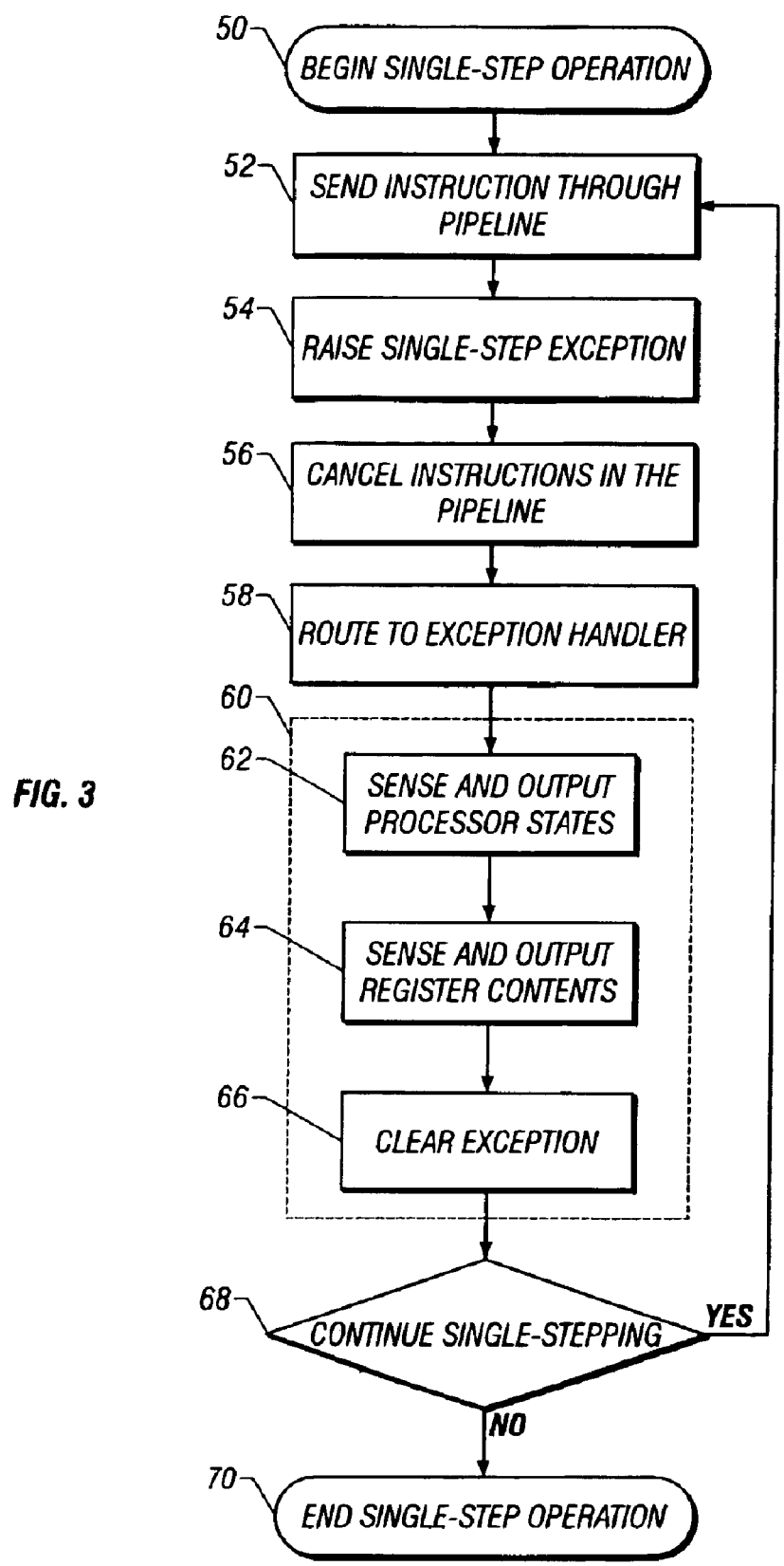
FIG. 3 is a flowchart illustrating a process for single-step debugging.

One mode of single-step debugging, illustrated in FIG. 3, employs taking an exception following each instruction. In general, an exception suspends normal program execution, while allowing the instruction ahead of the exception in pipeline 14 to complete execution. Upon initiating this mode of single-step debugging (50), control unit 12 directs fetch unit 30 to fetch a single instruction, which is processed through the stages of pipeline 14 (52). When the instruction reaches the WB stage, pipeline 14 raises an exception (54). The exception may be a specially defined single-step exception, and may be defined not to execute error-handling routines.

In response to the single-step exception, control unit 12 typically cancels instructions in the pipeline 14 (56) and routes control to exception handler 20 (58). Exception handler 20 includes addresses of pre-defined instructions to be processed in pipeline 14 when a single-step exception is raised (60). Such instructions may include sensing the processor states and outputting information about the states via input/output interface 18 (62), sensing the register contents and outputting the contents (64), and clearing the exception (66). The instructions may be adapted to sense particular register contents or particular processor states. In addition, outputting information may include sending information to input/output device 22, such as a printer or display screen, and may also include writing the information to main memory 16. The instructions (60) shown in FIG. 3 are exemplary. Other instructions may be executed, such as dumping contents of main memory 16 or a cache, or saving and restoring processor states.

When the exception is cleared (66) and other instructions of the exception handler have been executed, control unit 12 may continue the single-step debug process (68) by sending another instruction through pipeline 14 (52), which results in another exception upon completion (54). The instruction to be sent is typically one that was previously sent through pipeline 14 but was cancelled (56) before execution was completed, due to the previously handled exception. The user may also choose to terminate single-step operation (70).

Single-step debugging by taking single-step exceptions may be useful for some purposes, and is usually fast and inexpensive, and usually requires no additional hardware. This technique may not be suitable for all purposes, however. For example, this technique may not be effective for debugging the exception handler itself. In addition, the technique may not be effective for debugging protected system resources such as high-level event-handling routines. High-level event-handling routines may have, for example, higher priorities than the exceptions, and consequently may take precedence over the exceptions and may prevent the exceptions from being raised.

Another approach to single-step debugging is to enter a high-level operating mode, such as emulation mode, and feed each instruction individually to pipeline 14. Generally speaking, a processor may have many modes of operation, such as a user mode and a supervisory mode, which will be discussed in more detail below. Emulation mode is a mode of operation adapted for operations such as debugging. Typically, in emulation mode pipeline 14 fetches instructions from an emulation instruction register, rather than from main memory 16 or an instruction cache. Pipeline 14 also typically reads and writes data from an emulation data register rather than from main memory 16 or a data cache.

Figure 4:
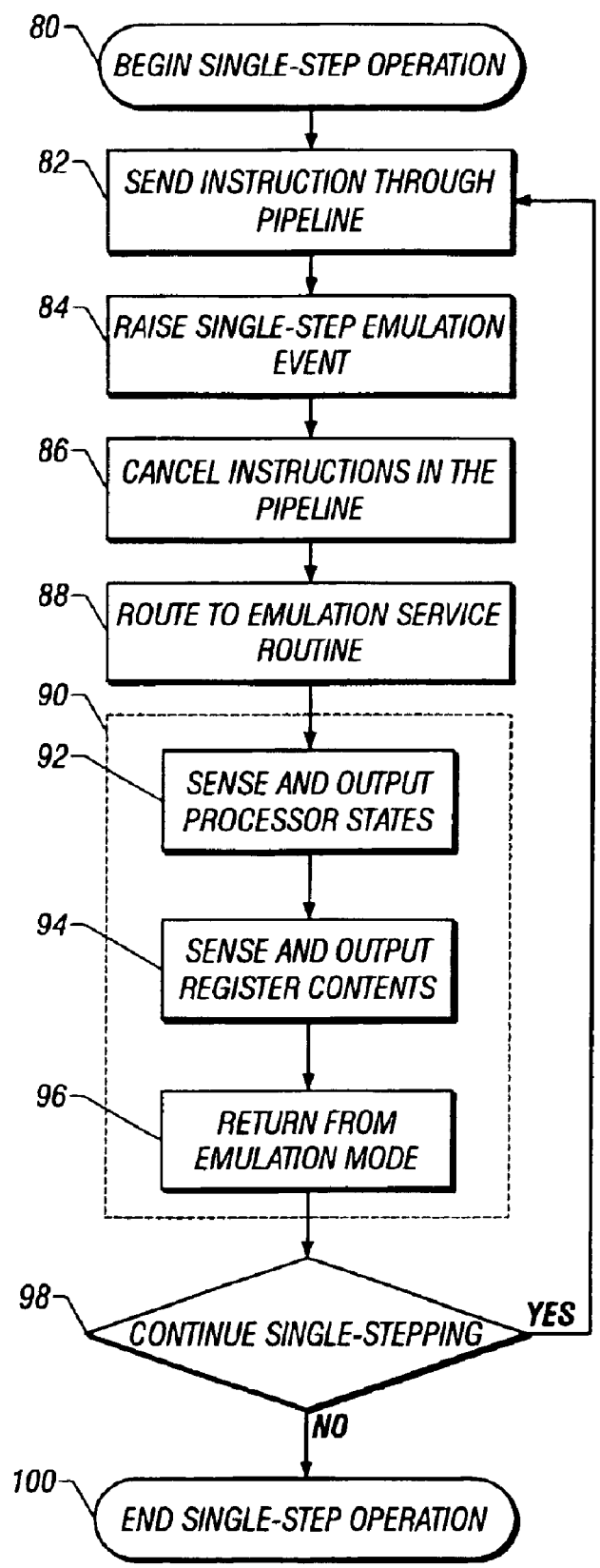
FIG. 4 is a flowchart illustrating another process for single-step debugging.

FIG. 4 is a flow chart illustrating an example process for single-step debugging, including processor 10 operating in emulation mode. Typically, processor 10 begins in a mode other than emulation mode, such as user mode or supervisor mode. Processor 10 may have more or fewer modes of operation than the user, supervisory and emulation modes. The user mode of operation is generally the most frequent form of operation. Applications running on processor 10 usually invoke the user mode of operation. In user mode, certain processor functions or system resources are deemed out of bounds and cannot be accessed. Attempted access of a restricted function or resource generally results in an error-type exception. Supervisor mode, by contrast, represents a higher priority mode of operation, in which all processor functions and resources are available. Emulation mode is usually a higher priority mode of operation than supervisor mode, allowing debugging of system resources that may otherwise be out of bounds. Consequently, single-step debugging in emulation mode may be preferable when system resources are to be debugged.

To begin single-step debugging (80), an instruction is sent through pipeline 14 (82). When the instruction reaches the WB stage, pipeline 14 raises an emulation event (84). Emulation mode may be invoked in different ways for different processor architectures, such as by applying a signal to a particular processor port or by executing software designed to invoke emulator mode. Once in emulation mode, high-level processor functions and resources are available, and inputs and outputs to processor 10 are regulated. Control unit 12 typically cancels instructions in the pipeline 14 (86) and routes control to an emulation service routine (88). The emulation service routine includes instructions that may include sensing the processor states and outputting information about the states via input/output interface 18 (92) and sensing the register contents and outputting the contents (94). Outputting information may include sending information to an output register or to input/output device 22, and may include writing the information to main memory 16. Emulation mode generally is terminated by a "return" instruction, which returns processor 10 to the state in which it was operating before invoking emulation mode and includes the address of the next instruction to be fetched (96). Typically, return from emulation mode after each step (96) is automatic, so continued single-step debugging (98) may involve each single-step operation being separately commanded. If no command to enter emulation mode is given, the single-step operation terminates (100).

Figure 5:
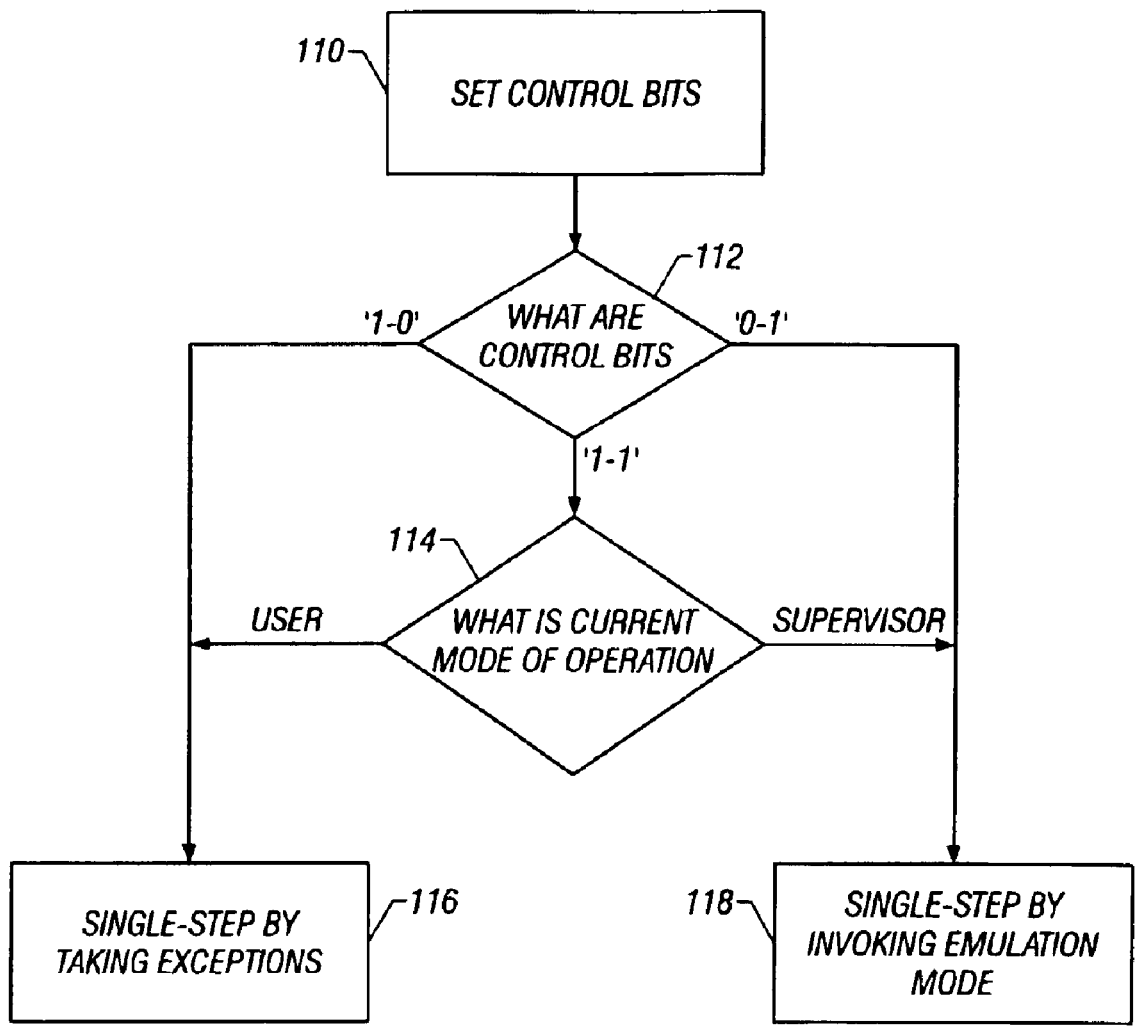
FIG. 5 is a flowchart illustrating a process for selecting one of the single-step debugging processes.

Control of single-step debugging can be regulated in many ways. An exemplary method to control single-step debugging, illustrated by FIG. 5, is to employ one or more control bits, which automatically result in the generation of the single-step debugging operations and instructions. Setting one or more control bits may be detected by logic that may trigger an exception or an emulation event. In exemplary processor 10 shown in FIG. 1, two control bits 23A and 23B are shown as stored in control register 25 and are made available to pipeline 14. Control bits 23A and 23B may be stored elsewhere and may be stored in any kind of memory element. Many processor architectures, however, support control registers. Use of two control bits 23A and 23B allows flexibility in single-step debugging. Control bits 23A and 23B can be set in four distinct logical configurations: '0-0,' '0-1,' '1-0' and '1-1.' The configurations may be assigned four different results. For example, the '0-0' configuration may be the norm, indicating that no single-step debugging of any form is to occur. Setting control bits 23A and 23B (110) comprises changing the bits from the '0-0' configuration to some other configuration. The mode of single stepping is a function of control bits 23A and 23B (112). The '0-1' configuration, for example, may result in single-step debugging by entry into emulation mode (118), regardless of whether processor 10 is in user mode or supervisor mode. Similarly, the '1-0' configuration, for example, may result in single-step debugging by taking exceptions (116), regardless of whether processor 10 is in user mode or supervisor mode. Finally, the '1-1' configuration may, for example, result in selection of the form of single-step debugging depending upon the current operating mode of processor 10 (114). When processor 10 is operating in user mode, the '1-1' configuration may cause processor 10 to single-step by taking exceptions (116), but when processor 10 is operating in supervisor mode, the '1-1' configuration may cause processor 10 to single-step by entering emulation mode (118). The results obtained by following the techniques shown in FIG. 5 are summarized in Table 1.

TABLE 1

| Control bits | Operating Mode | Single-step Debugging Mode |
| --- | --- | --- |
| '0-0' | User | None |
| '0-0' | Supervisor | None |
| '0-1' | User | Emulation |
| '0-1' | Supervisor | Emulation |
| '1-0' | User | Exception |
| '1-0' | Supervisor | Exception |
| '1-1' | User | Exception |
| '1-1' | Supervisor | Emulation |

A number of embodiments of the invention have been described. For example, methods of single-step debugging have been described, by taking an exception after each instruction or by placing the processor in an emulation mode. The processor may be implemented in a variety of systems including general purpose computing systems, digital processing systems, laptop computers, personal digital assistants (PDA's) and cellular phones. In this context, the single-step debugging techniques discussed above may be readily used to test the system before or after a customer sale. In such a system, the processor may be coupled to a memory device, such as a FLASH memory device or a SRAM device, that stores an operating system and other software applications. These and other embodiments are within the scope of the following claims.

What is claimed is:

1. A computer implemented method comprising:
    assigning a state to a plurality of control bits, wherein the state is a first state when a first debugging mode is to be selected by the invocation of a first debug handler, and wherein the state is a second state when a second debugging mode is to be selected by the invocation of a second debug handler, and wherein the state is a third state when one of a plurality of debugging modes is to be selected as a function of a current operating mode of a processor; and
    invoking one of a plurality of debug handlers based on the state of the control bits, wherein the plurality of debug handlers includes the first debug handler and the second debug handler, and wherein the first debug handler comprises an emulation service routine and wherein the second debug handler comprises an exception handler.

2. The method of claim 1 wherein selecting the debugging mode as a function of the current operating mode of the processor comprises selecting a first debugging mode when the operating mode comprises a supervisor mode, and selecting a second debugging mode when the operating mode comprises a user mode.

3. The method of claim 1, wherein the first debug handler is capable of debugging the second debug handler.

4. The method of claim 1, further comprising using the first debug handler to debug the second debug handler.

5. The method of claim 1, further comprising determining whether to bypass said selecting one of a plurality of debugging modes as a function of a current operating mode of the processor and to instead select one of a plurality of debug modes without regard to the current operating mode of the processor.

6. A method comprising:
    receiving an instruction;
    receiving a signal;
    selecting a mode of debugging as a function of the signal, wherein selecting the debugging made comprises selecting a first debugging mode using a first debug handler when the signal is a first signal, selecting a second debugging mode using a second debug handler when the signal is a second signal, and selecting the debugging mode as a function of a current operating mode of a processor when the signal is a third signal;
    invoking one of plurality of debug handlers, wherein the plurality of debug handlers includes the first debug handler and the second debug handler; and
    executing the instruction.

7. The method of claim 6 further comprising raising an exception.

8. The method of claim 6 further comprising invoking an emulation event.

9. The method of claim 6 further comprising:
    sensing register contents; and
    outputting register contents.

10. The method of claim 6, wherein the instruction is received by the processor, and wherein the processor is adapted to operate in a plurality of states, the method further comprising:
    sensing states of the processor; and
    outputting states of the processor.

11. The method of claim 6, wherein:
    the first debugging mode comprises invoking an emulation event;
    the second debugging mode comprises raising an exception; and
    the selecting the debugging mode as a function of a current operating mode of a processor comprises selecting the first debugging mode when a current operating mode of the processor comprises a supervisor mode and selecting the second debugging mode when a current operating mode of the processor comprises a user mode.

12. The method of claim 6, wherein the selected debug mode comprises raising an exception after executing an instruction, and wherein the current operating mode of the processor comprises a supervisor mode.

13. A device comprising:
    a processor, the processor adapted to operate in a plurality of operating modes including an emulation mode;
    a control register adapted to store the state of at least one control bit; and
    a plurality of debug handlers, wherein the plurality of debug handlers includes a first debug handler and a second debug handler, and wherein the first debug handler comprises an emulation service routine and the second debug handler comprises an exception handler;
    wherein the processor is adapted to assign the state of the at least one control bit, wherein the state is a first state when a first debugging mode is to be selected by the invocation of a first debug handler, and wherein the state is second state when a second debugging mode is to be selected by the invocation of a second debug handler, and wherein the state is a third state when one of a plurality of debugging modes is to be selected as a function of a current operating mode of a processor.

14. The device of claim 13, wherein the processor is adapted to select one of a plurality of debugging modes as a function of the current operating mode of the processor.

15. The device of claim 13, wherein the processor is further adapted to select the first debugging mode when the current operating mode comprises a supervisor mode and to select the second debugging mode when the current operating mode comprises a user mode.

16. The device of claim 15, wherein the first debugging mode comprises an emulation debugging mode and wherein the second debugging mode comprises an exception debugging mode.

17. The device of claim 13, further comprising exception logic adapted to sense the state of the at least one control bit and to trigger an exception event as a function of the state of the at least one control bit.

18. The device of claim 13, further comprising emulation logic adapted to sense the state of the at least one control bit and to trigger an emulation event as a function of the state of the at least one control bit.

19. The device of claim 13, wherein the at least one control bit is a first control bit, the device further comprising a second control register adapted to store the state of a second control bit, and wherein the mode of single-step debugging is a function of the state of the second control bit.

20. The device of claim 13, wherein the processor is a digital signal processor.

21. A device comprising:
 a processor, the processor adapted to operate in a plurality of operating modes; and
 a register adapted to store the state of a signal;
 wherein the processor is adapted to select a debugging mode as a function of the signal, wherein selecting the debugging mode comprises selecting a first debugging mode using a first debug handler when the signal is first signal, selecting a second debugging mode using s second debug handler when the signal is a second signal, and selecting the debugging mode as a function of a current operating mode of the processor when the signal is a third signal; and
 wherein the processor is further adapted to invoke one of a plurality of debug handlers, wherein the plurality of debug handlers includes the first debug handler and the second debug handler.

22. The device of claim 21 further comprising a control register adapted to store the state of a control bit, wherein the processor is adapted to select one of the plurality of debugging modes as a function of the state of the control bit.

23. The device of claim 22, further comprising
 an exception handler; and
 logic adapted to sense the state of the control bit and to trigger an exception event as a function of the state of the control bit.

24. The device of claim 22, further comprising logic adapted to sense the state of the control bit and to trigger an emulation event as a function of the state of the control bit.

25. The device of claim 21, wherein the processor is a digital signal processor.

26. The device of claim 21, wherein:
 the first debugging mode comprises invoking an emulation event;
 the second debugging mode comprises raising an exception; and
 said selecting the debugging mode as a function of a current operating mode of a processor comprises selecting the first debugging mode when a current operating mode of the processor comprises a supervisor mode and selecting the second debugging mode when a current operating mode of the processor comprises a user mode.

27. A method comprising:
 receiving an instruction;
 receiving a signal; and
 selecting a debugging mode, wherein said selecting a debugging mode comprises:
  selecting an emulation debugging mode when the signal is a first signal;
  selecting an exception debugging mode when the signal is a second signal;
  selecting the emulation debugging mode when the signal is a third signal and when a current operating mode of a processor comprises a supervisor mode; and
  selecting the exception debugging mode when the signal is the third signal and when the current operating mode of the processor comprises a user mode.

28. The method of claim 27, wherein the selected debugging mode comprises an exception debugging mode and wherein the current operating mode of the processor comprises a supervisor mode.

29. The method of claim 27, wherein the third signal signifies that the selected debugging mode should be one level higher than the current operating mode of the processor.

* * * * *